United States Patent
Smith

(10) Patent No.: US 11,357,311 B2
(45) Date of Patent: Jun. 14, 2022

(54) HAIR WEAVE REMOVAL TOOL AND METHOD OF USING SAME

(71) Applicant: Jennifer M. Smith, Chicago, IL (US)

(72) Inventor: Jennifer M. Smith, Chicago, IL (US)

(*) Notice: Subject to any disclaimer, the term of this patent is extended or adjusted under 35 U.S.C. 154(b) by 184 days.

(21) Appl. No.: 16/207,883

(22) Filed: Dec. 3, 2018

(65) Prior Publication Data
US 2020/0170380 A1    Jun. 4, 2020

(51) Int. Cl.
| | | |
|---|---|---|
| *A45D 44/00* | (2006.01) | |
| *B26B 11/00* | (2006.01) | |
| *G02B 25/02* | (2006.01) | |
| *G02B 25/00* | (2006.01) | |
| *A41G 5/00* | (2006.01) | |

(52) U.S. Cl.
CPC ............ *A45D 44/00* (2013.01); *B26B 11/008* (2013.01); *G02B 25/005* (2013.01); *G02B 25/02* (2013.01); *A41G 5/004* (2013.01)

(58) Field of Classification Search
CPC ........ A41G 5/02; A45D 40/24; A45D 40/205; A45D 40/20; A45D 40/28; A45D 2040/0012; A45D 2200/1072; A45D 2200/25; A45D 44/00; A45D 2026/008; B26B 11/008; G02B 25/005
See application file for complete search history.

(56) References Cited

U.S. PATENT DOCUMENTS

| | | | | | |
|---|---|---|---|---|---|
| 2,387,054 | A | * | 10/1945 | Brustolon | G02B 25/002 403/61 |
| 2,435,741 | A | * | 2/1948 | Fleenor | G02B 25/005 359/807 |
| 4,147,411 | A | * | 4/1979 | Barry | G02B 25/005 359/823 |
| 4,398,800 | A | * | 8/1983 | Hayes | G02B 25/005 359/809 |
| 4,524,647 | A | * | 6/1985 | Holoff | B25B 23/18 294/99.2 |
| 5,209,757 | A | * | 5/1993 | Krug | A61F 11/006 606/162 |
| 5,263,754 | A | * | 11/1993 | Coleman | A45D 26/0066 294/99.2 |
| 5,358,297 | A | * | 10/1994 | Coleman | A45D 26/0066 294/99.2 |
| 5,369,555 | A | * | 11/1994 | McKain | B25B 23/18 362/120 |
| 6,379,019 | B1 | * | 4/2002 | Lin | B25B 23/18 362/186 |
| 6,476,984 | B1 | * | 11/2002 | Ringdahl | A45D 27/00 132/289 |
| 7,108,395 | B2 | * | 9/2006 | Correa | B25B 9/02 362/190 |

(Continued)

*Primary Examiner* — Cris L. Rodriguez
*Assistant Examiner* — Brianne E Kalach
(74) *Attorney, Agent, or Firm* — Foley & Lardner LLP

(57) ABSTRACT

A hair weave removal tool includes a handle, an elongated member, a magnifier, and a light source. The elongated member extends from an end of the handle. The elongated member includes an extension extending outwardly therefrom and a guide member located laterally adjacent the extension. The magnifier is pivotably coupled to the handle laterally adjacent the elongated member. The light source is coupled to the handle, and is configured to illuminate an area above the extension.

11 Claims, 4 Drawing Sheets

(56) References Cited

U.S. PATENT DOCUMENTS

| | | | | |
|---|---|---|---|---|
| 7,178,847 B1* | 2/2007 | Mui | ................... | B25B 9/02 |
| | | | | 294/99.2 |
| 7,339,754 B2* | 3/2008 | Neal | ................ | A45D 26/0066 |
| | | | | 359/802 |
| 8,707,968 B2* | 4/2014 | Gardner | ............... | A41G 5/0086 |
| | | | | 132/200 |
| 8,726,821 B2 | 5/2014 | White | | |
| 8,820,956 B2* | 9/2014 | Reznik | ................ | B25B 9/00 |
| | | | | 362/120 |
| 2002/0105797 A1* | 8/2002 | Navid | ................ | F21V 33/0084 |
| | | | | 362/120 |
| 2005/0237634 A1* | 10/2005 | Rothmann | ............ | G02B 25/02 |
| | | | | 359/811 |
| 2006/0266379 A1* | 11/2006 | Shelton | ................ | A45D 24/10 |
| | | | | 132/333 |
| 2007/0125398 A1* | 6/2007 | Johnson | ................. | A45D 2/00 |
| | | | | 132/200 |
| 2011/0289780 A1* | 12/2011 | Tiegs | ................... | B26B 11/008 |
| | | | | 362/119 |
| 2015/0007847 A1* | 1/2015 | Nissim | ................. | A41G 5/006 |
| | | | | 132/201 |

* cited by examiner

HAIR WEAVE REMOVAL TOOL AND METHOD OF USING SAME

BACKGROUND

The present disclosure relates generally to hair styling tools. More specifically, the present disclosure relates to a hair weave removal tool and a method of using the same.

Generally speaking, a hair weave (sometimes referred to as a "hair extension") can be installed on a person's head to, for example, provide additional hair volume or length. Typically, the hair weave is installed by sewing a "track" of the hair weave to the person's natural hair near their scalp line using thread (e.g., silk thread, etc.). The sewing pattern and thread is typically discrete to help blend or disguise the hair weave with the person's natural hair. Removal of the hair weave from the person's head can be difficult due to the sensitive location of the track near the person's scalp line and due to the small, discrete nature of the sewing pattern/thread.

Thus, there is a need for a tool that can allow for safe and effective removal of a hair weave from a person's head, so as to avoid injuring the person, injuring the user of the tool, or damaging the hair weave itself.

SUMMARY

At least one embodiment relates to a hair weave removal tool. The hair weave removal tool includes a handle, an elongated member, a magnifier, and a light source. The elongated member extends from an end of the handle. The elongated member includes an extension extending outwardly therefrom and a guide member located laterally adjacent the extension. The magnifier is pivotably coupled to the handle laterally adjacent the elongated member. The light source is coupled to the handle, and is configured to illuminate an area above the extension.

Another embodiment relates to a hair weave removal tool. The hair weave removal tool includes a handle, an elongated member, a magnifier, and a light source. The elongated member extends from an end of the handle in a substantially straight direction. The elongated member includes an extension extending outwardly therefrom and a guide member extending laterally adjacent the extension. The magnifier is pivotably coupled to the handle laterally adjacent the elongated member. The light source is coupled to the handle, and is configured to illuminate an area above the extension.

Yet another embodiment relates to a method of removing a hair weave using a hair weave removal tool. The method includes inserting an extension of the hair weave removal tool through a threaded loop along a track of the hair weave on a person's head; engaging a guide member of the hair weave removal tool with the person's head; and pivoting the hair weave removal tool about the guide member to lift the extension away from the track to undo the threaded loop.

This summary is illustrative only and is not intended to be in any way limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, disclosed herein is a hair weave removal tool that includes features that allow for safer and more effective removal of a hair weave from a person's head, as compared to conventional tools. According to an exemplary embodiment, the disclosed hair weave removal tool includes a guide member extending laterally adjacent an extension extending from a handle of the tool. The extension can be used to remove the sewn thread along a hair weave track, and the guide member can, advantageously, help the user to determine a location of the extension relative to a person's scalp, so as to help to protect the person's scalp during the hair weave removal process. The guide member can also facilitate removal of the sewn thread along a hair weave track by providing leverage for pivoting the extension relative to a person's head, so as to lift the thread away from the track.

The disclosed hair weave removal tool further includes a pivotable magnifier and a light source located laterally adjacent the extension that can help to assist a user with the hair weave removal process by magnifying/illuminating an area above the extension along the hair weave track near the person's scalp line.

The disclosed hair weave removal tool further includes a substantially straight extension extending outwardly from an ergonomically shaped handle that can, advantageously, help to facilitate more effective removal of the sewn thread along a hair weave track, as compared to conventional tools that include, for example, a curved extension. In this manner, the disclosed hair weave removal tool can allow for safer and more effective removal of a hair weave from a person's head, as compared to conventional tools. These and other advantageous features will become more apparent after reading the following description and claims.

Although the following detailed description is directed specifically to removing hair weaves, it is envisioned that the disclosed tool can be used in a variety of other applications, such as fixing a hem on clothing or removing stitching/thread from other sewn products (e.g., drapes, upholstery, etc.).

Figure 1:
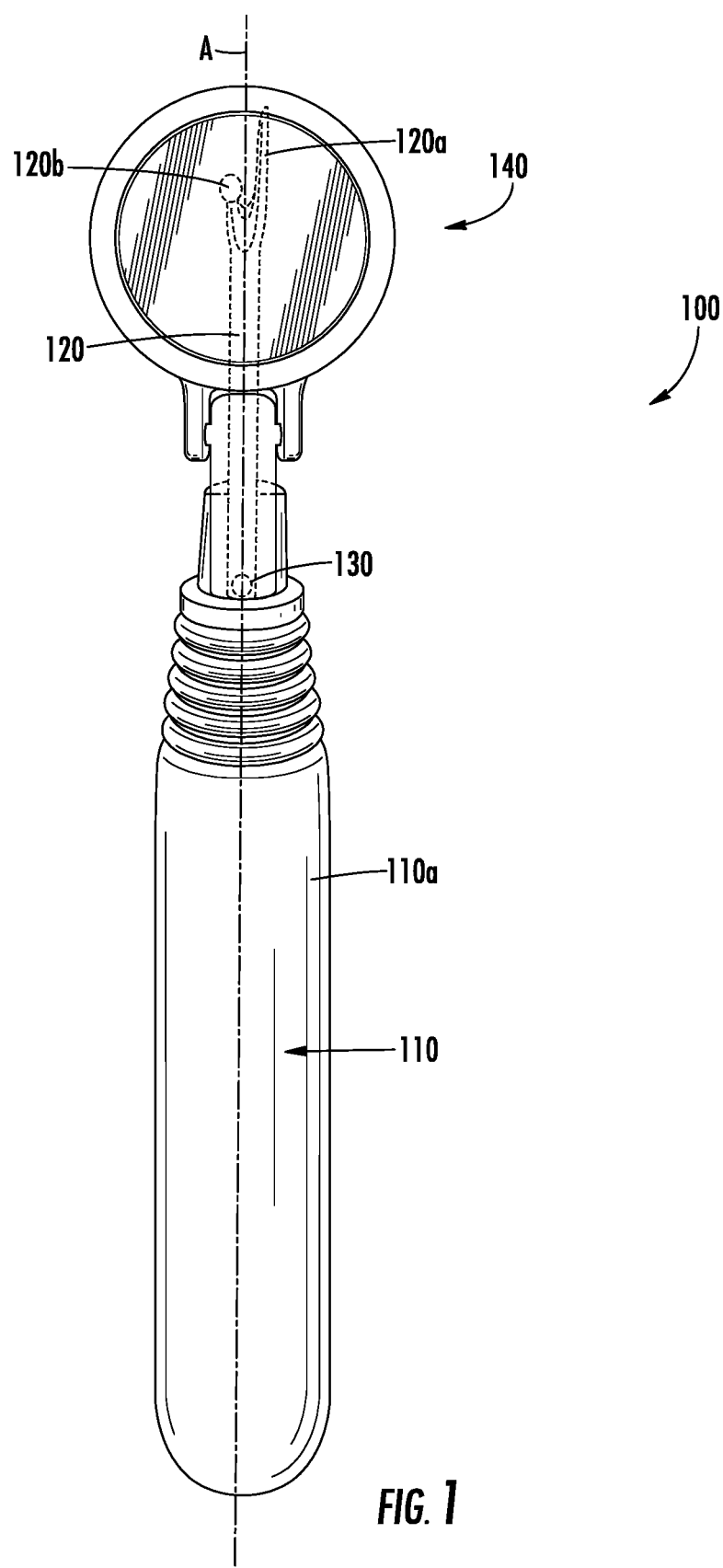
FIG. 1 is a side view of a hair weave removal tool according to an exemplary embodiment.
Figure 6:
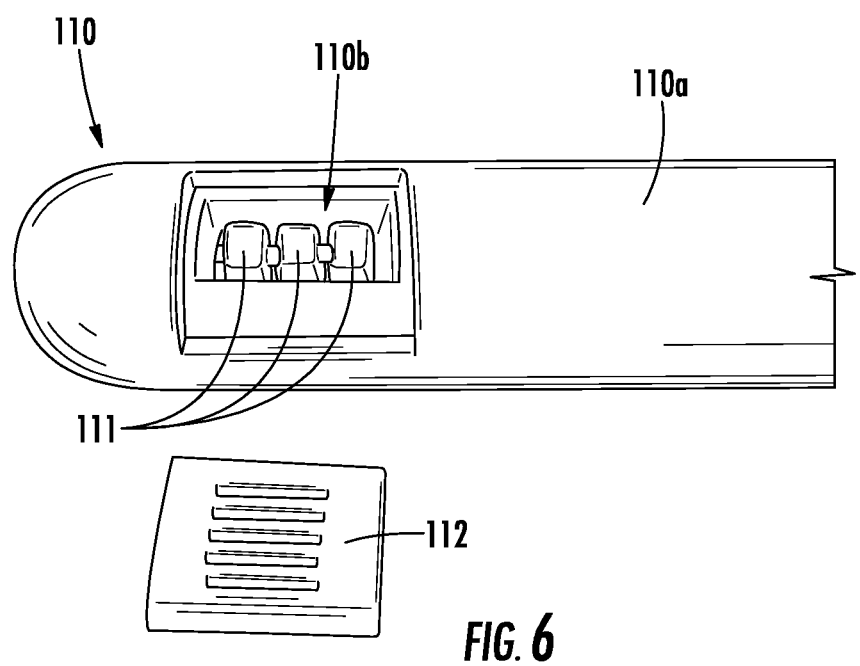
FIG. 6 is another partial detail view of the handle of the hair weave removal tool of FIG. 1.

Referring to FIG. 1, a hair weave removal tool 100 is shown according to an exemplary embodiment. As shown in FIG. 1, the hair weave removal tool includes a handle 110. The handle 110 has a generally elongated, cylindrical shape that defines a central longitudinal axis "A," although it should be appreciated that the handle 110 may have other cross-sectional shapes, such as octagonal, square, elliptical, or other shapes, according to other exemplary embodiments. The handle 110 includes an outer surface 110a having a contoured, ergonomic shape that is configured to be complementary to the shape of a person's hand, so as to facilitate gripping of the tool 100. According to an exemplary embodiment, the handle 110 is made from a substantially rigid material, such as a polymeric material, and can include a surface treatment applied to at least a portion of the handle (e.g., knurls, rubberized coatings, etc.). The handle 110 further includes a hollow portion 110b (shown in FIG. 6) for containing various electronic components, such as a power source, wiring, a circuit board, or other electronic components. As shown in the embodiment of FIG. 6, for example, the handle 110 further includes a removable cover 112 for accessing the hollow portion 110b, so as to facilitate the replacement of, for example, power source 111. The handle 110 further includes a switch 113 disposed on the outer surface 110a. The switch 113 is configured to enable a user to control a light source 130 of the tool 100, the details of which are described in the paragraphs that follow. According to another exemplary embodiment, the handle 110 includes a hollow portion configured as a storage compartment for storing various accessories (e.g., thread, replacement batteries, etc.).

Figure 2:
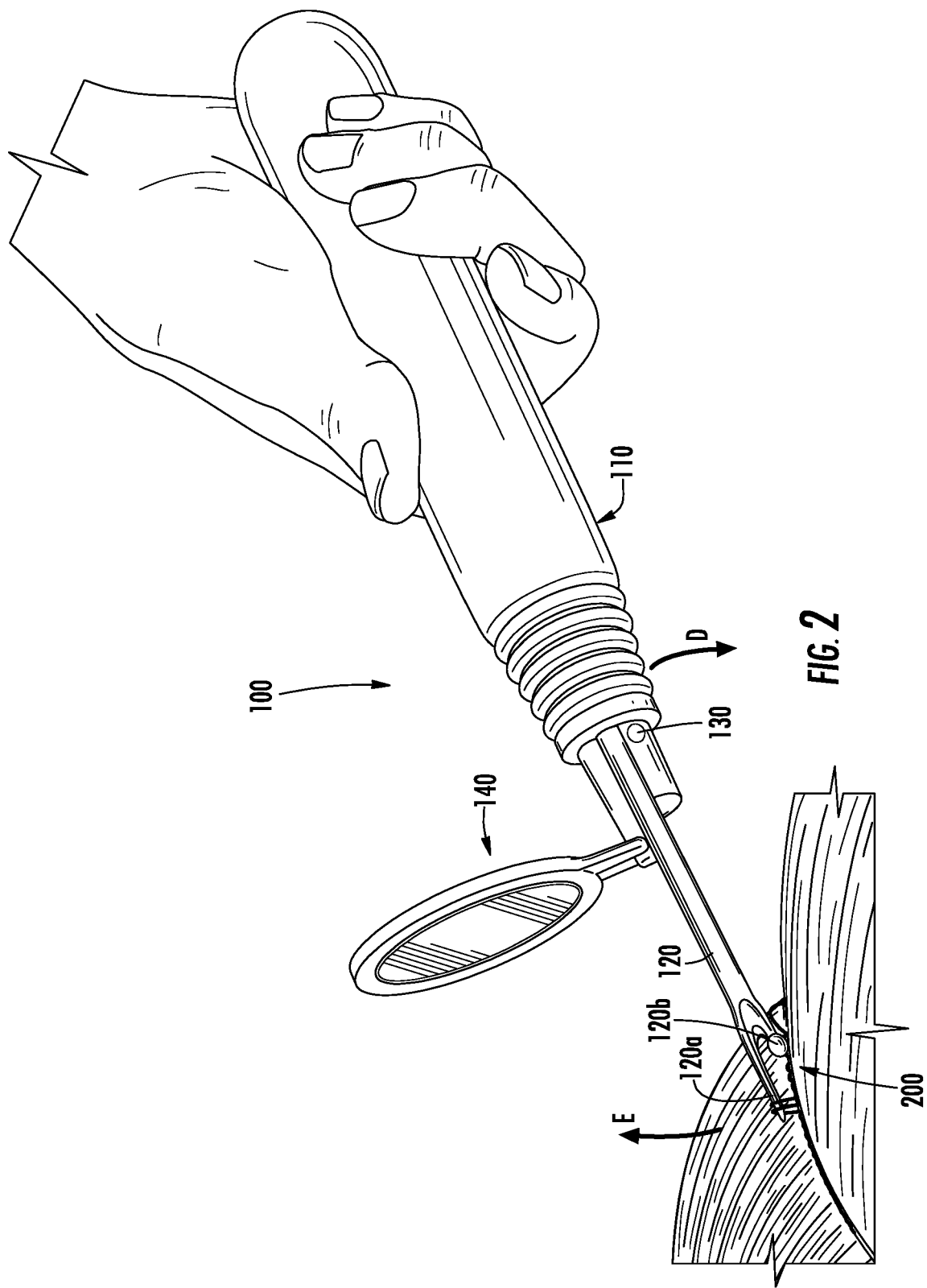
FIG. 2 is a partial perspective view of the hair weave removal tool of FIG. 1 shown being used to remove a hair weave from a person's head according to an exemplary embodiment.
Figure 3:
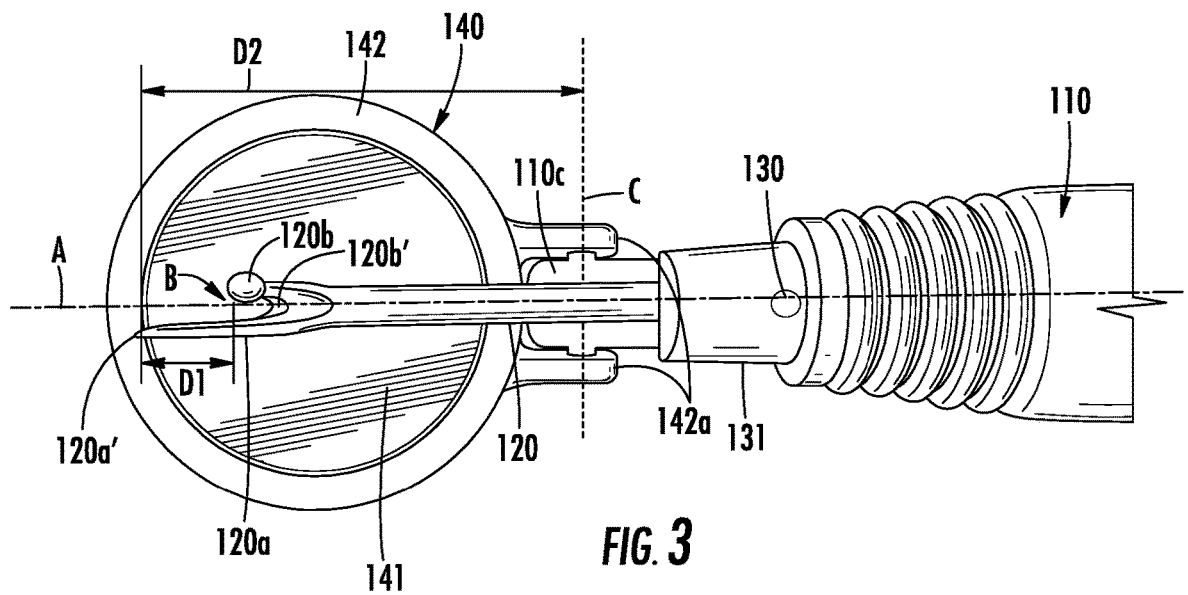
FIG. 3 is a partial detail view of the hair weave removal tool of FIG. 1.

Referring to FIGS. 1-3, the hair weave removal tool 100 further includes an elongated member 120 extending substantially along, or parallel to, axis A outwardly away from an end of the handle 110. The elongated member 120 includes an extension 120a extending outwardly therefrom, and a guide member 120b disposed above, and laterally adjacent to, the extension 120a, as shown in the orientation of FIG. 3. It should be appreciated, however, that the hair weave removal tool 100 may be oriented differently such that the guide member 120b is disposed below the extension 120a, such as in the embodiment of FIG. 2. The orientation shown in FIG. 2 is particularly advantageous in that the guide member 120b can help to protect a person's scalp during the hair weave removal process, the details of which are discussed below.

As shown in FIG. 3, the extension 120a is spaced apart from the guide member 120b and extends outwardly away from the elongated member 120 in a substantially straight direction. Applicant advantageously found that a substantially straight extension 120a can facilitate more efficient removal of thread that is sewn along a hair weave track, as compared to conventional tools, which typically have a curved shape. According to an exemplary embodiment, the extension 120a extends along an axis that is substantially parallel to axis A. The extension 120a includes a pointed tip 120a' at a distal end that is configured to be received through a threaded loop of a sewn hair weave track near a person's scalp to help facilitate removal of the hair weave. The elongated member 120 further includes a blade 120b' at a proximal end between the extension 120a and the guide member 120b. The blade 120b' has an arcuate shape and is at least partially surrounded by the extension 120a and the guide member 120b, which can help to prevent a user from inadvertently cutting themselves by the blade 120a'. In other words, the blade 120b' is only accessible at a cutting area "B" defined between the extension 120a and the guide member 120b near a proximal end thereof near the handle 110. The blade 120b' can, advantageously, be used to cut through thread or other portions of a hair weave track to facilitate removal of the hair weave, as discussed in greater detail below.

Still referring to FIG. 3, the guide member 120b is located laterally adjacent the extension 120a and extends outwardly from the elongated member 120. That is to say, the extension 120a and the guide member 120b are laterally spaced apart from each other and parallel to axis A. According to an exemplary embodiment, the extension 120a extends a first distance D1 in the range of about 0.5" to about 0.75" from an end of the guide member 120b. This range of relative distances is particularly advantageous to allow for sufficient insertion of the extension 120a through a threaded loop of a sewn hair weave track, while helping to reduce the likelihood of inadvertent contact of the extension 120a with a person's scalp during the hair weave removal process.

For example, as shown in the exemplary embodiment of FIG. 2, the extension 120a is shown at least partially inserted through a threaded loop of a hair weave track 200 on a person's scalp as part of the hair removal process. The guide member 120b is shown contacting the person's head below the extension 120a, so as to help determine the relative location/angle of the extension 120a (e.g., the relative insertion distance of the tip 120a' into the hair weave track 200, etc.). That is to say, the tip 120a' of the extension 120a may not be entirely visible to the user when the extension 120a is inserted into the weave track 200, but the guide member 120b will be visible to the user, such that the user will know how far the extension 120a has been inserted into the track relative to the person's scalp, since the user knows the relative distance between the guide member 120b and the extension tip 120a' (i.e., distance D1). In this way, the user can more effectively control the position of the extension 120a relative to the person's scalp to help avoid injuring the person. In addition, by resting the guide member 120b on the person's head below the extension 120a during the removal process, as shown in FIG. 2, the angular position of the extension 120a can be more easily controlled or adjusted by the user, so as to help prevent potential injury to the person's head during the removal process (e.g., by preventing the tip 120a' from contacting the person's scalp, etc.).

Still referring to FIG. 2, a method of removing a hair weave using the hair weave removal tool 100 will now be described. In a first step, a user can insert a portion of the extension 120a including the tip 120a' through a threaded loop of the hair weave track 200, as shown in FIG. 2. In a second step, the user can engage the guide member 120b with the person's head, although this step may be performed simultaneously with the first step or before the first step, according to other exemplary embodiments. In a third step, the user can pivot the tool 100 about the guide member 120b in a direction indicated generally by arrow "D", so as to lift the extension 120a in an upward direction indicated generally by arrow "E", to thereby lift and undo the threaded loop of the hair weave track 200. That is to say, the guide member 120b can provide controlled leverage against the person's head to assist the user with lifting the extension 120a with sufficient force to undo the threaded loops of the hair weave track 200. This method can be repeated for each threaded loop of the sewn hair weave track 200 until all of the thread has been removed from between the track 200 and the person's hair/scalp. If, however, the threaded loops along the hair weave track 200 are unable to be lifted/undone, in a fourth step, the user can insert the extension 120a through one of the threaded loops and guide the extension 120a forward until the threaded loop is received in the cutting area B. The user can then use the blade 120b' to cut through the thread by applying a forward force on the hair weave removal tool 100.

According to the exemplary embodiment of FIG. 3, the guide member 120b has a spherical shape to help facilitate pivotable movement of the tool relative to a person's head, although the guide member 120b may have other shapes, according to other exemplary embodiments. According to an exemplary embodiment, the guide member 120b includes a visual identifier, such as a color that contrasts with typical human hair colors, a pattern, or other visual identifier, such that the guide member 120b is clearly visible to a user during the hair weave removal process. The visual identifier of the guide member 120b can, advantageously, help a user to determine the location of the extension 120a/pointed tip 120a' in a hair weave track, as explained above. According to an exemplary embodiment, the guide member 120b includes a compressible material, such as rubber or foam, so as to help to protect a person's head when, for example, the guide member 120b is contacting the person's head during the hair weave removal process, as described above with reference to FIG. 2.

According to an exemplary embodiment, the elongated member 120 including the extension 120a and the blade 120b' is made from a medical grade steel (e.g., stainless steel, etc.). According to other exemplary embodiments, the elongated member 120 is made from another rigid material (e.g., aluminum, etc.). According to an exemplary embodiment, the handle 110 is overmolded onto the elongated member 120 to form a unitary structure. According to other exemplary embodiments, the elongated member 120 is coupled to the handle 110 (e.g., adhesively bonded, fastened, etc.).

Figure 4:
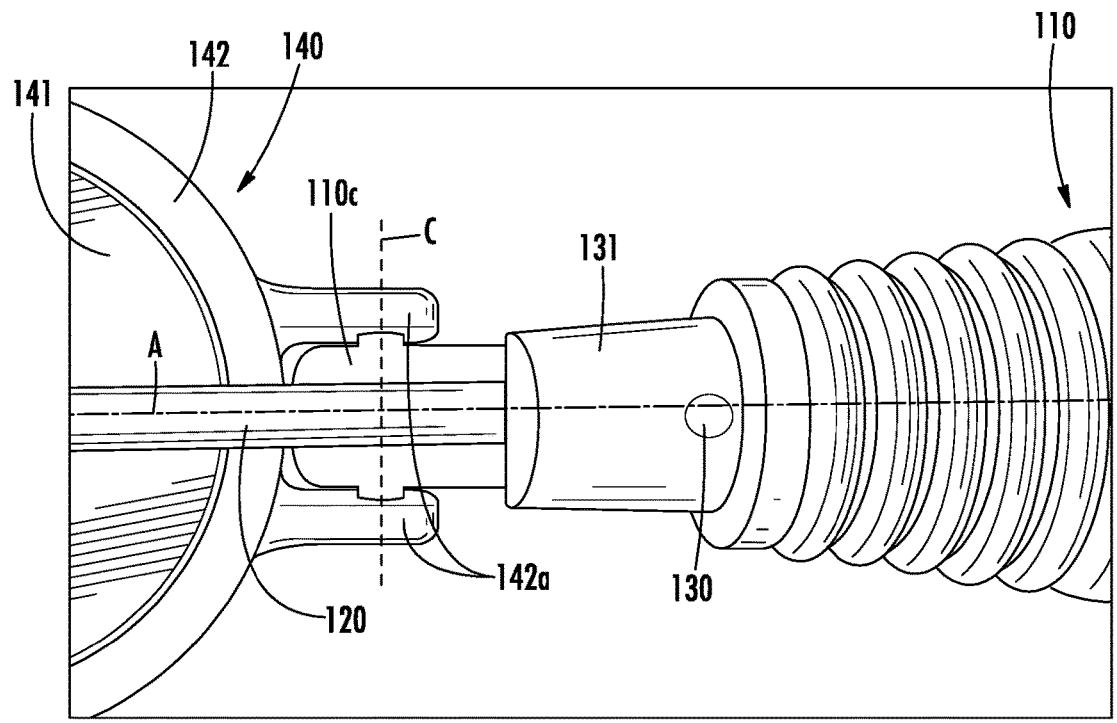
FIG. 4 is a partial detail view of a light source of the hair weave removal tool of FIG. 1.
Figure 5:
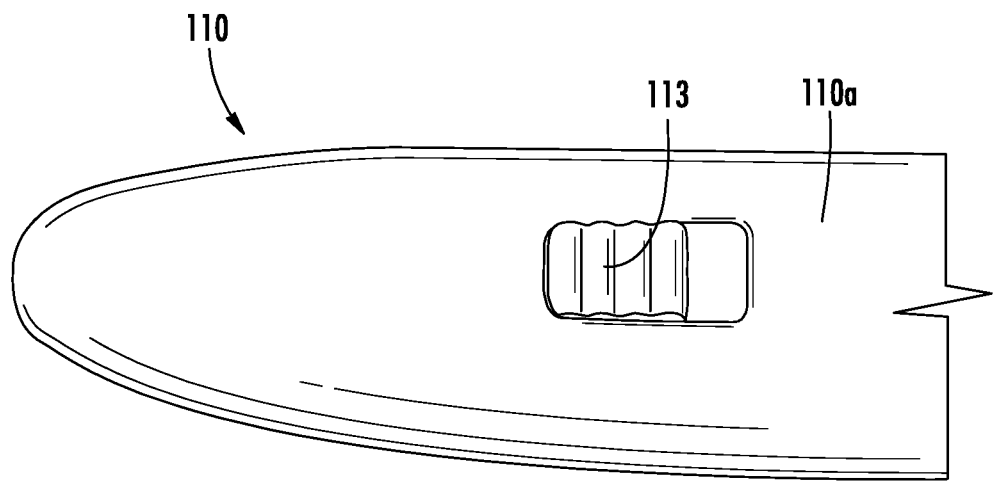
FIG. 5 is a partial detail view of a handle of the hair weave removal tool of FIG. 1.

Referring to FIGS. 3-4, the hair weave removal tool 100 further includes a light source 130 coupled at an end of the handle 110 nearest the elongated member 120. The light source 130 is positioned laterally adjacent the elongated member 120 and is configured to be positioned substantially above the extension 120a when the hair weave removal tool 100 is being used to remove a hair weave from a person's head (see, for example, the orientation/position of FIG. 2). The light source 130 is substantially surrounded by a light guide 131 (e.g., lens, etc.). The light guide 131 is configured to distribute light outwardly from the light source 130 toward the extension 120a, so as to illuminate an area on a person's scalp during the hair weave removal process. According to an exemplary embodiment, the light source 130 includes one or more light emitting diodes (LEDs), although the light source 130 may include other types of light sources, such as an incandescent bulb, an OLED, or other suitable light sources, according to other exemplary embodiments. As shown in FIGS. 5-6, the light source 130 is electrically coupled to the switch 113 and a power source 111 (e.g., batteries, etc.) that are coupled to the handle 110 via associated electrical wiring (not shown). The switch 113 is configured to allow a user to selectively control the on/off functionality of the light source 130.

Still referring to FIGS. 3-4, the hair weave removal tool also includes a magnifier 140 pivotably coupled to the handle 110. The magnifier 140 is positioned laterally adjacent the extension 120a opposite the light source 130 with the elongated member 120 disposed therebetween. The magnifier 140 is configured to be selectively pivoted about a pivot axis "C" by a user, such that the magnifier 140 can be rotated between a plurality of different angular positions, so as to assist a user with the hair weave removal process (e.g., to help the user focus on particular areas of the hair weave track 200, etc.). The magnifier 140 is shown to include a substantially transparent magnifying lens 141 surrounded along a peripheral edge by a frame 142. The frame 142 includes two legs 142a extending outwardly and substantially parallel to each other from the frame. The legs 142a pivotably couple the magnifier 140 to a joint 110c extending from an end of the handle 110 (e.g., via protrusions extending from at least one of the joint 110c and the legs 142a, a pin, etc.). The joint 110c defines the pivot axis C that the magnifier 140 is configured to pivot about. According to an exemplary embodiment, the pivot axis C is located a distance D2 in the range of about 1.0 inch to about 1.5 inches relative to an end of the tip 120a'. Applicant, advantageously, found that this range of distances allows for sufficient clearance of the magnifier 140 relative to a hair weave on a person's head, while providing for sufficient magnification of the hair weave track to assist a user during the removal process (see, for example, FIG. 2).

In this manner, the disclosed hair weave removal tool can allow for safer and more effective removal of a hair weave from a person's head, as compared to conventional tools.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure. In addition, the order or sequence of any process or method steps may be varied or re-sequenced according to alternative embodiments.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

It is important to note that the construction and arrangement of the hair weave removal tool and method of using the same as shown in the various exemplary embodiments is illustrative only. Additionally, any element disclosed in one embodiment may be incorporated or utilized with any other embodiment disclosed herein.

What is claimed is:

1. A hair weave removal tool comprising:
   a handle comprising a first end, a second end opposite the first end, and a hollow portion, the handle extending along a central longitudinal axis;
   an elongated member comprising a proximal and a distal end; the proximal end coupled to and extending outwardly from the second end of the handle along the central longitudinal axis, wherein the elongated member further comprises an extension and a guide member extending outwardly from the distal end of the elongated member along opposing sides of the central longitudinal axis, where the extension is configured to be received through a threaded loop of a sewn hair weave track;
   a magnifier; the magnifier pivotably coupled to a joint, the joint extending outwardly from the second end of the handle, laterally adjacent to the elongated member, such that the magnifier is located at a portion of the joint remote from the second end of the handle and is configured to provide magnification to a user of at least a portion of the extension;
   a light source integrally formed with the handle and extending from the second end of the handle laterally adjacent the elongated member such that the elongated member is disposed between the magnifier and the light source, and wherein the light source is configured to illuminate an area around the extension; and
   a power source disposed in the hollow portion of the handle, wherein the power source is electrically coupled to the fight source.

2. The hair weave removal tool of claim 1, wherein the magnifier includes a frame having a plurality of legs extending outwardly therefrom, wherein the legs pivotably couple the magnifier to a joint extending from an end of the handle, and wherein the joint of the handle defines the pivot axis.

3. The hair weave removal tool of claim 1, wherein the extension includes a pointed tip at a distal end of the extension.

4. The hair weave removal tool of claim 1, wherein the elongated member further includes a blade disposed between the extension and the guide member, and wherein the extension is spaced apart from the guide member to define a cutting area therebetween for accessing the blade.

5. The hair weave removal tool of claim 1, wherein the extension is substantially straight.

6. The hair weave removal tool of claim 1, wherein the guide member includes a visual identifier.

7. The hair weave removal tool of claim 1, wherein the guide member includes a compressible material.

8. The hair weave removal tool of claim 1, wherein the extension extends a distance in the range of about 0.5 inches to about 0.75 inches from an end of the guide member.

9. A method comprising:
   providing a hair weave removal tool comprising a handle, a light source and a magnifier;
   the hair weave removal tool further comprising an elongated member that extends outwardly from a second end of the handle along a central longitudinal axis, and further comprising an extension and a guide that extend from a distal end of the elongated member on opposing sides of the central longitudinal axis;
   wherein the magnifier is pivotally connected to a joint member extending outwardly from the second end of the handle along the central longitudinal axis;
   activating the light source of the hair weave removal tool such that the area around the extension is illuminated;
   inserting the extension of the hair weave removal tool through a threaded loop along a track of a hair weave, wherein the extension is viewable through the magnifier;
   engaging a guide member of the hair weave removal tool with the person's head; and then pivoting the hair weave removal tool about the guide member to lift the extension away from the track to undo the threaded loop.

10. The method of claim 9, wherein the guide member includes a compressible material.

11. The method of claim 9, wherein the hair weave removal tool includes a blade disposed between the extension and the guide member, and the method further comprises inserting the threaded loop between the extension and the guide member to cut the threaded loop using the blade.

* * * * *